Feb. 25, 1936.          G. W. BAUGHMAN          2,032,106
             CONTROL CIRCUIT FOR ELECTRIC BRAKES
                    Filed Dec. 15, 1933
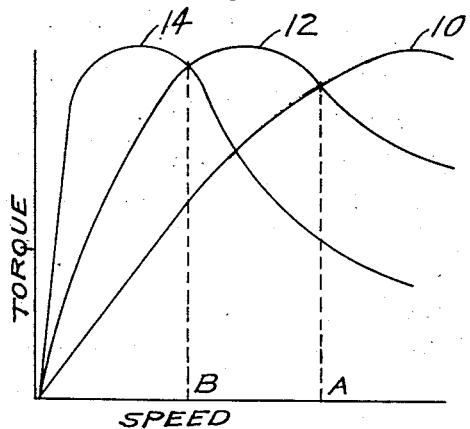
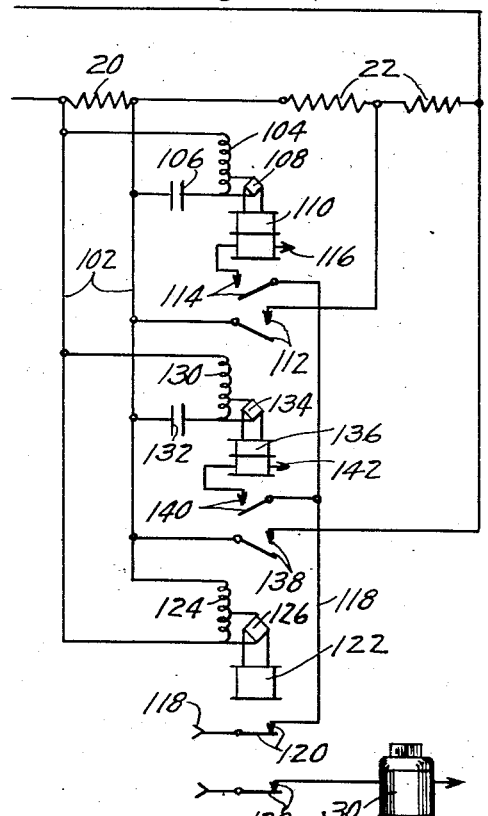
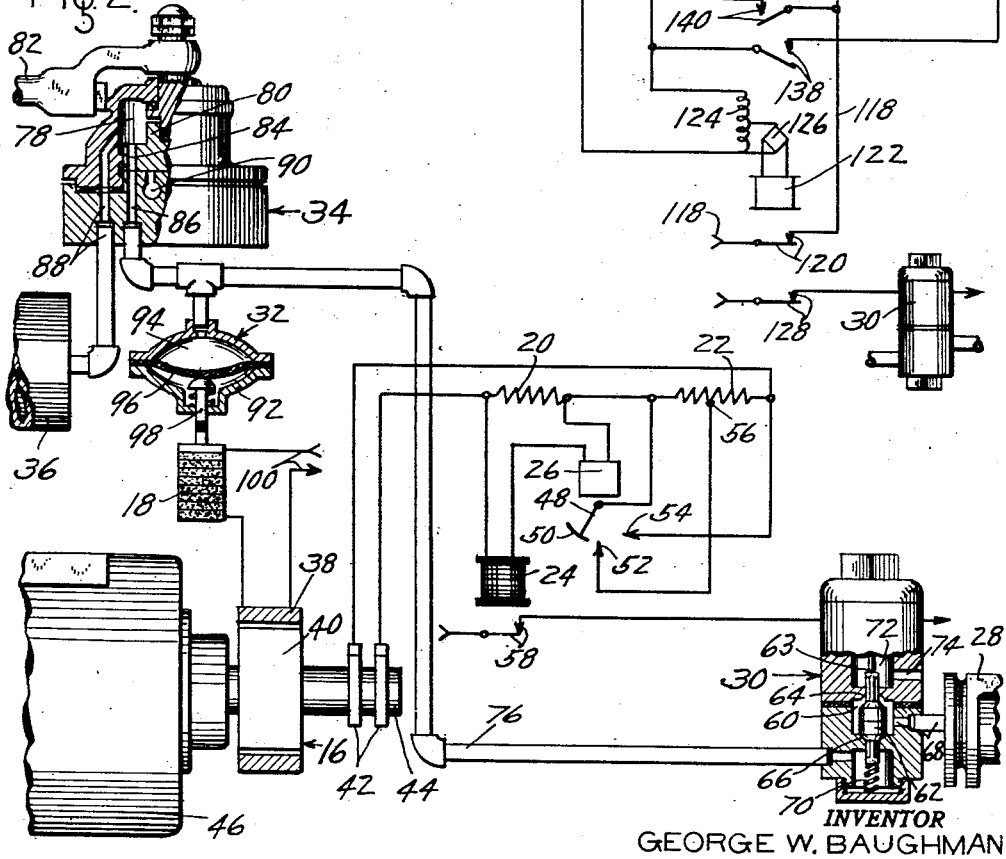
INVENTOR
GEORGE W. BAUGHMAN
BY Wm. M. Cady
                ATTORNEY Patented Feb. 25, 1936

2,032,106

UNITED STATES PATENT OFFICE 2,032,106

CONTROL CIRCUIT FOR ELECTRIC BRAKES

George W. Baughman, Edgewood, Pa., assignor to The Westinghouse Air Brake Company, Wilmerding, Pa., a corporation of Pennsylvania Application December 15, 1933, Serial No. 702,536

12 Claims. (Cl. 303—3)

This invention relates to vehicle brakes, and more particularly to the control of brakes of the electro-dynamic type.

When an electro-dynamic brake of the induction motor or eddy current type is employed to brake a vehicle, if the speed-torque characteristic of the brake is such that the braking effect decreases rapidly with decrease of the speed, then the vehicle will be brought to a stop too slowly, unless a friction brake is employed to augment the electro-dynamic brake over that portion of the deceleration period in which the electro-dynamic braking effect is decreasing rapidly. A general object of my invention is to provide means for controlling the speed-torque characteristic of electro-dynamic brakes in a manner such that a more nearly constant braking effect over the whole deceleration period of a vehicle is produced, so that a vehicle may be decelerated rapidly with the electro-dynamic brake and a friction brake need be employed only to augment the electro-dynamic brake at very low speeds, and to hold the vehicle at rest.

Another object of my invention is to provide a control apparatus operated according to the speed of a vehicle, so that as the speed diminishes to a point where the braking effect begins to diminish rapidly, the control apparatus acts to increase the braking effect to maintain it more nearly constant.

Another object is to provide a control apparatus of this character for use in connection with a vehicle employing both an electro-dynamic brake and a friction brake, in which the friction brake is cut out of action so long as the control apparatus is operative to maintain the effectiveness of the electro-dynamic brake, but which cuts the friction brake into action when the electro-dynamic brake becomes ineffective.

Other objects and advantages will be apparent from the following description of two embodiments of my invention, which I have illustrated in the attached drawing. In this drawing, Fig. 1 is a graph for use in more clearly describing my invention.

Fig. 2 is a schematic arrangement of apparatus chosen for one embodiment.

Fig. 3 is a partial schematic arrangement of apparatus for use in connection with certain of the apparatus of Fig. 2, comprising the other embodiment.

Referring to the graph of Fig. 1, I have, for the purpose of more clearly indicating the braking characteristic of an electro-dynamic brake, selected curves 10, 12, and 14 as representing different speed-torque characteristics of an induction motor or eddy current type brake. The ordinates of these curves represent torque, corresponding to braking effect, while the abscissas represent speed of the vehicle with which the brake is associated.

Curve 10 is the speed-torque characteristic of the brake with a given rotor resistance; curve 12 is the speed-torque characteristic with a different rotor resistance; and curve 14 is the speed-torque characteristic with a still different rotor resistance. It will be observed that all of the curves have substantially the same maximum torque value, but that the maximum value for each curve occurs at a different speed. It will, therefore, be seen that the effect of rotor resistance is to change the speed-torque characteristic of the brake. While I have referred specifically to "rotor" resistance, as will hereinafter more clearly appear, the term is to be taken as referring generally to the braking member receiving current by induction.

It will also be observed from Fig. 1, that curves 10 and 12 cross at a speed corresponding to that indicated by the letter "A", and that similarly curves 12 and 14 cross at a speed corresponding to that indicated by the letter "B".

The curves 10, 12 and 14 are not to be taken as representing the speed-torque characteristics of all types and designs of electro-dynamic brakes, as it is well known that brakes may be designed to have one of a wide variety of characteristics. The curves shown have been selected because they are well adapted to aid in describing my invention.

For the embodiment of my invention shown in Fig. 2, I have provided electrical apparatus including an electro-dynamic brake device 16, having associated therewith a rheostat device 18, resistance devices 20 and 22, a no-voltage relay 24, and a frequency response relay 26; and fluid pressure apparatus including a brake cylinder 28, a magnet valve device 30, a fluid pressure operated device 32, a brake valve 34, and a main reservoir 36.

The electro-dynamic brake device 16 is diagrammatically indicated as having a stator member 38, which is to be understood as having a winding to which current may be supplied, as for example a continuous or direct current, and a rotor member 40, which is to be understood as having a winding in which current is induced when the stator winding is energized. The rotor winding is connected to slip rings 42, which are in turn connected to a series circuit including the resistance devices 20 and 22. The rotor member 40 and the slip rings 42 may be rigidly secured to an extension of a motor drive shaft 44 associated with a drive motor 46. The slip rings are insulated from each other and from the shaft.

Since the resistance devices 20 and 22 are connected in series with the winding of the rotor 40, they are effective in forming a part of the total rotor resistance.

For varying the effective rotor resistance the frequency response relay 26 has been provided. This relay, which may be of the type described in either United States Patent No. 960,553, granted to L. F. Howard, June 7, 1910, or United States Patent No. 1,116,283, also granted to L. F. Howard, November 3, 1914, is provided with a rotatable member, indicated diagrammatically at 48, carrying a contact 50 adapted to sequentially engage stationary contacts 52 and 54. Contact 50 is connected to one end terminal of resistance device 22, while contact 54 is connected to the other end terminal and contact 52 to a tap 56. Thus, as contact 50 is caused to sequentially engage contacts 52 and 54 the resistance device 22 is shunted in steps, so that the effective resistance of the rotor 40 is reduced in steps. The resistance device 20 remains constantly in the rotor circuit and is unvaried. The rotor resistance therefore may have one of three values, corresponding to the combined resistance of three groups of apparatus, namely: rotor itself, plus resistance device 20, plus all of resistance device 22; or, rotor itself, plus resistance device 20, plus portion of resistance device 22; or, rotor itself, plus resistance device 20. For illustrative purposes hereinafter, it will be assumed that the three values of rotor resistance just described are effective in causing the brake device 16 to develop the three speed-torque characteristics of Fig. 1, and that curve 10 corresponds to the greatest value of rotor resistance, curve 12 to the next value, and curve 14 to the lowest value.

The frequency response relay 26 and the no-voltage relay 24 are connected in series and the series combination shunted across the resistance device 20. Current flowing in the resistance device 20 will thus energize both relays. The relay 26 actuates the rotatable member 48 in accordance with the frequency of the current in the resistance device 20, and since the frequency is proportional to the speed of the rotor (and hence to that of the vehicle), the relay will cause contact 50 to successively engage the contacts 52 and 54 in accordance with the speed of the vehicle, as will hereinafter more fully appear.

The relay 24 will hold contacts 58 in engagement so long as the current in resistance device 20 is great enough to produce a voltage across the relay exceeding a chosen value, of which more will be said later. Contacts 58 control the energization of an electro-magnet in the magnet valve device 30, which may be energized from any convenient source of current supply, as for example a battery.

The magnet valve device 30 comprises a casing defining a valve chamber 60 containing a double beat valve 62 secured to a stem 63 and having an upper seat 64 and a lower seat 66. The valve chamber 60 is in constant open communication with the brake cylinder 28 by pipe and passage 68. The double beat valve 62 is urged toward its upper seat 64 by spring 70 and to its lower seat by an electro-magnet in the upper part of the valve device casing, which attracts downward theretoward an armature secured to the end of the stem 63. When the double beat valve is in its lower seated position, fluid under pressure in the brake cylinder 28 is released to the atmosphere past the open upper seat 64, through chamber 72 and port 74. When the valve is in its upper seated position, the brake cylinder is no longer vented to the atmosphere and fluid under pressure is supplied to the brake cylinder from pipe 76, past the open lower seat 66, through valve chamber 60, and pipe and passage 68.

For controlling the application of the brakes, the brake valve device 34 is provided. This device comprises a casing provided with a chamber 78 in which is disposed a rotary valve 80 adapted to be operated by a handle 82 and having a passage 84 therein adapted to connect the chamber 78 with a passage 86 to which is connected the pipe 76. The chamber 78 is in constant communication with the main reservoir 36 by pipe and passage 88. When the handle 82 is in release position the passages 84 and 86 are out of registration and passage 86 is connected with an exhaust passage 90.

For controlling the supply of current to the winding of the stator 38 in accordance with fluid under pressure supplied to the pipe 76, to operate the friction brake (not shown) associated with the brake cylinder 28, the fluid pressure device 32 and the rheostat device 18 are provided. The fluid pressure device 32 comprises a casing 92 connected to the pipe 76 and provided with a chamber 94 in which is disposed a flexible diaphragm 96. When fluid under pressure is supplied to pipe 76 it flows to the chamber 94 to one side of the diaphragm 96, causing it to operate rod 98 to compress carbon discs in the rheostat device 18, which I have indicated as being of the well known "carbon pile" type, although I may use any other type operating to vary the current in accordance with the fluid pressure established in pipe 76. Current may be supplied to the stator winding from any convenient source through conductors 100. Varying the current in the stator winding will vary the maximum braking torque, but will not alter the torque-speed characteristic.

In operation, when the handle 82 of the brake valve device 34 is in release position, the supply of fluid under pressure to the brake cylinder is cut off and fluid pressure in the brake cylinder released to the atmosphere. Also the supply of current to the electro-dynamic brake is cut off by opening the circuit thereto, which may be controlled in any suitable manner. With the electro-dynamic brake deenergized, relay 24 will be deenergized and contacts 58 will be opened, as by gravity effect, a spring, or the like. With contacts 58 open the electro-magnet of the valve device 30 will be deenergized and valve 62 will be urged to its upper seated position by spring 70.

When it is desired to effect an application of the brakes, handle 82 is moved to supply fluid under pressure to pipe 76 in a degree in accordance with the degree of braking desired, and simultaneously, the circuit to the stator winding of the electrodynamic brake is closed. Fluid under pressure in pipe 76 flows to the device 32, causing the discs of the rheostat device 18 to be compressed, and current is therefore supplied to the stator winding in accordance with the fluid pressure in pipe 76. Current in the stator winding produces a magnetic field which induces or generates a current in the rotor winding which reacts with the flux to produce a braking effect. The current in the rotor flows to the external circuit connected to the slip rings 42 which includes the resistance device 20. Current in resistance device 20 energizes both relays 24 and 26. Energizing relay 24 closes contacts 58, thereby energizing the electro-magnet of the valve device 30 and thus moving valve 62 to its lower seated position. Supply of fluid under pressure to the brake cylinder is thereby cut off and fluid pressure in the brake cylinder is released to the atmosphere.

The frequency response relay 26 is adapted to move the rotatable member 48 in accordance with the frequency of the rotor current. Assuming that the vehicle is traveling at a maximum rate of speed when the brakes are applied, then the frequency of the rotor current will be a maximum. The relay is adapted to position the member 48 to the left for the higher frequencies and as the frequency diminishes to move the member to the right, so that for the maximum frequency, the member 48 is positioned to the extreme left and contact 50 is out of engagement with either of contacts 52 or 54. The rotor therefore has its largest value of resistance effective, and the speed-torque characteristic will be as represented by curve 10 of Fig. 1.

Assuming that the maximum speed of the vehicle is that corresponding to the speed for the right hand end of the curve 10, then as the speed decreases the braking torque first increases and then begins to decrease. The relay 26 is designed to bring contacts 50 and 52 into engagement at or about the speed corresponding to that at "A" of Fig. 1, so that a portion of the resistance device 22 is shunted, thus reducing the effective rotor resistance. Beginning at speed "A" then, the brake develops a speed-torque characteristic corresponding to curve 12. As the vehicle speed diminishes to that represented at "B", contact 50 engages contact 54, and bridges contacts 52 and 54. All of the resistance device 22 is thus shunted, and the brake speed-torque characteristic is as represented by curve 14.

As the vehicle speed diminishes further, a point is finally reached, corresponding to a very low speed, at which relay 24 becomes insufficiently energized to hold contacts 58 closed, and the electro-magnet of the valve device 30 is thus deenergized. Valve 62 is then urged to its upper seated position, whereby fluid under pressure is supplied to the brake cylinder to operate the friction brake. The friction brake then acts to bring the vehicle to a stop and hold it at rest.

The relay 26 will hold contacts 50 and 54 in engagement, to hold shunted all of resistance device 22, until after relay 24 is deenergized.

If at any time when the electro-dynamic brake is in operation the electric power supply should fail, the current in the rotor circuit would cease to flow and relay 24 would be deenergized. The friction brake would therefore be cut into action.

In Fig. 3 I have provided a novel arrangement of frequency tuned circuits for operating relays to accomplish the changes in rotor resistance just described. The resistance devices 20 and 22 are still employed and connected to the slip rings 42 of the rotor as before. Shunted across the resistance device 20 by conductors 102, I have provided a tuned circuit comprising a reactance device 104 and a condenser device 106 connected in series and adapted to produce resonance at a frequency corresponding to the vehicle speed represented by "A" in Fig. 1. Connected across a portion of the reactance device 104 through a rectifier device 108 is a relay 110, which is adapted to close contacts 112 and 114 when resonance obtains in the tuned circuit. Closing of contacts 112 shunts out a portion of the resistance device 22, while closing of contacts 114 energizes a holding coil on the relay from a suitable source of supply through conductors 116 and 118 and contacts 120 of a no-voltage relay 122, which is connected across a portion of a reactance device 124 through a rectifier device 126, the reactance device 124 being also shunted across the resistance device 20 by conductors 102.

The no-voltage relay 122 also operates contacts 128 to control the magnet valve device 30, in the same manner as heretofore described in connection with contacts 58.

Also shunted across the resistance device 20 by conductors 102 is another tuned circuit comprising a reactance device 130 and a condenser device 132 connected in series and adapted to produce resonance at a frequency corresponding to the vehicle speed represented by "B" in Fig. 1. Connected across a portion of the reactance device 130 through a rectifier device 134 is a relay 136 adapted to close contacts 138 and 140 when resonance obtains in the tuned circuit. Closing of contacts 138 shunts out all of the resistance device 22, while closing of contacts 140 energizes a holding coil on the relay from a suitable source through conductors 142 and 118 and the heretofore referred to contacts 120 of no-voltage relay 122.

The operation of this embodiment is similar to that of the first embodiment. When current is supplied to the electro-dynamic brake stator, the rotor current resulting flows through the resistance device 20, thereby energizing the relay 122 and closing contacts 128 to prevent the friction brakes from being applied. Contacts 120 are also closed. Assuming that the vehicle is traveling at maximum speed, as before, both relays 110 and 136 remain deenergized, and all of the resistance device 22 is effective. The speed-torque characteristic of the brake then corresponds to curve 10 of Fig. 1. As the speed diminishes to that corresponding to "A", relay 110 is energized, shunting out a portion of the resistance device 22, and the speed-torque characteristic is as per curve 12. As the speed diminishes to that corresponding to "B", relay 136 is energized, shunting out all of the resistance device 22, and the speed-torque characteristic is as per curve 14. At some very low chosen speed the relay 122 permits contacts 120 and 128 to open, thereby cutting in the friction brake and deenergizing the relay holding coils. The vehicle is thus brought to a stop and held at rest by the friction brake.

While I have illustrated my invention in connection with controlling the resistance of the rotor, it is equally well adapted to control the resistance of the stator in designs where the rotor is the member having current supplied thereto and the stator is the member having current induced therein.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a vehicle brake apparatus, the combination with a brake cylinder and an electro-dynamic brake, of means for supplying fluid under pressure to said brake cylinder, tuned frequency circuits including sequentially operable relays for controlling said brake, and means preventing fluid under pressure from being supplied to said brake cylinder until said relays have operated.

2. In an electrodynamic brake system, the combination with a stator member and a rotor member, of means for supplying current to said stator member, a circuit connected to said rotor member, a plurality of resistance devices connected in said circuit, a relay connected across one of said resistance devices and operated according to the frequency of current flowing in said resistance device to diminish in steps the effective resistance of the other of said resistance devices.

3. In a vehicle brake system, the combination with a brake cylinder and an electrodynamic brake device having a rotor and a stator, of means for supplying current to said stator, a relay associated with said rotor and adapted to have current supplied thereto from said rotor, and a magnet valve device for controlling the supply of fluid under pressure to said brake cylinder and operable to cut off said supply all the while said relay is energized.

4. In a vehicle brake system, the combination with an electrodynamic brake device having a rotor member and a stator member, of a brake cylinder, a magnet valve device controlling a communication through which fluid under pressure is supplied to said brake cylinder and also controlling a second communication through which fluid pressure in said brake cylinder is released to the atmosphere, means for supplying current to one of said members, a circuit connected to the other of said members, a resistance device in said circuit, a frequency responsive device responsive to the frequency of current in said circuit and operable to diminish the effective resistance of said resistance device, and a relay associated with said circuit and adapted to be energized when the current in said circuit exceeds a predetermined value to effect operation of said magnet valve device to close said first communication and open said second communication and to be deenergized when said current drops below said predetermined value to effect operation of said magnet valve device to open said first communication and close said second communication.

5. In an electric brake system, the combination with a rotor and a stator inductively related and operable to produce an electric braking effect, of means for supplying current to said stator, a circuit connected to said rotor, a resistance device in said circuit, a plurality of differently tuned frequency responsive circuits in shunt with said first circuit, a relay associated with each of said tuned circuits and each relay being responsive to a resonant condition of its associated circuit to shunt a portion of said resistance device.

6. In an electrodynamic brake system, the combination with a rotor member and a stator member inductively related, of means for supplying current to one of said member, a circuit connected to the other of said members, two resistance devices connected in said circuit, and a frequency responsive device connected across one of said resistance devices and having contacts connected to the other of said resistance devices, said device being operative to diminish the effective resistance of said second resistance device as the frequency of current in said first resistance device diminishes.

7. In a vehicle brake system, the combination with a rotor member and a stator member inductively related, and a brake cylinder, of a circuit for supplying current to said stator member, a resistance device in said circuit, means for supplying fluid under pressure to said brake cylinder, means responsive to the pressure of said fluid for varying the resistance of said resistance device, a second circuit connected to said rotor, a second resistance device in said second circuit, a frequency responsive relay responsive to the frequency of current in said second circuit and operable to reduce the effectiveness of the resistance of said second resistance device, a magnet valve device operable to prevent the supply of fluid under pressure to said brake cylinder, and a relay responsive to current in said second circuit for controlling said magnet valve device.

8. In a vehicle brake system, in combination, an electric brake device having a rotor and stator inductively related and operable to produce an electric braking effect, means for supplying current to said stator, a closed circuit connected to said rotor, a resistance device connected in said circuit, a plurality of differently tuned frequency responsive circuits connected to said first circuit, a plurality of relays associated with said frequency tuned circuits, each of said relays being adapted to operate at a frequency different from the other of said relays, and means for cutting out portions of said resistance device upon operation of each of said relays.

9. In a vehicle brake system, in combination, an electric brake device having a rotor and a stator inductively related and operable to produce an electric braking effect, means for supplying current to said stator, a closed circuit connected to said rotor, a resistance device connected in said closed circuit, a plurality of auxiliary circuits connected in parallel and to said closed circuit, each of said auxiliary circuits containing an inductance and a capacitance connected to produce a resonant condition at a desired frequency of current in said closed circuit, the resonant condition produced by any one auxiliary circuit being different from the resonant condition produced by the other of said auxiliary circuits, a plurality of relays each of which is associated with a different auxiliary circuit and operated upon a resonant condition in that circuit, and means whereby operation of each of said relays cuts out a portion of said resistance device.

10. In a vehicle brake system, in combination, an electric brake device having a rotor and a stator operable to produce a braking effect, means for supplying current to said stator, a closed circuit connected to said rotor, a resistance device in said closed circuit, a plurality of frequency tuned circuits connected in parallel and to said closed circuit, each of said frequency tuned circuits being adapted to produce a resonant condition at a chosen frequency of the current in said closed circuit, a plurality of relays associated with said auxiliary circuits, each of said relays being adapted to be energized during a different resonant condition in said frequency tuned circuits, a holding circuit for maintaining said relays energized after said relays are operated in response to a resonant condition in said frequency tuned circuits, and a separate relay operable to close said holding circuit when the current in said closed circuit exceeds a predetermined value.

11. In a vehicle brake system, in combination, an electric brake device having a rotor member and a stator member inductively related, means for supplying current to one of said members, a closed circuit connected to the other of said members, two resistance devices connected in said closed circuit, a plurality of frequency tuned circuits connected in parallel and to one of said resistance devices, a plurality of relays associated with said frequency tuned circuits, each of said relays being adapted to operate at a different frequency, and means for cutting out portions of said other resistance device upon operation of said relays.

12. In a vehicle brake system, in combination, a brake cylinder, an electrodynamic brake device having a rotor and a stator, means for supplying current to said stator, a magnet valve device operable when deenergized to open a communication through which fluid under pressure is supplied to said brake cylinder and operable when energized to close said communication and to establish a second communication through which fluid under pressure is released from said brake cylinder, a circuit for supplying current to said magnet valve device, and a relay connected to said rotor and operable when energized above a predetermined degree to close said circuit.

GEORGE W. BAUGHMAN.